US005956683A

United States Patent [19]
Jacobs et al.

[11] Patent Number: 5,956,683
[45] Date of Patent: *Sep. 21, 1999

[54] DISTRIBUTED VOICE RECOGNITION SYSTEM

[75] Inventors: Paul E. Jacobs; Chienchung Chang, both of San Diego, Calif.

[73] Assignee: QUALCOMM Incorporated, San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/627,333

[22] Filed: Apr. 4, 1996

Related U.S. Application Data

[63] Continuation of application No. 08/534,080, Sep. 21, 1995, which is a continuation of application No. 08/173,247, Dec. 22, 1993.

[51] Int. Cl.[6] ........................................ G10L 3/00
[52] U.S. Cl. ................... 704/275; 704/201; 704/251; 704/270
[58] Field of Search .................... 395/2.09, 704, 395/275, 270, 201, 251, 455, 411, 412, 413

[56] References Cited

U.S. PATENT DOCUMENTS

| | | | |
|---|---|---|---|
| 4,567,606 | 1/1986 | Vensko et al. | 381/43 |
| 4,961,229 | 10/1990 | Takahashi | 381/42 |
| 4,991,217 | 2/1991 | Garrett et al. | 381/43 |
| 5,012,518 | 4/1991 | Liu et al. | 381/42 |
| 5,040,212 | 8/1991 | Bethards | 395/2.1 |
| 5,045,082 | 9/1991 | Smith et al. | 395/2.84 |
| 5,109,509 | 4/1992 | Katayama et al. | 395/600 |
| 5,146,538 | 9/1992 | Sobti et al. | 395/2.09 |
| 5,231,670 | 7/1993 | Goldhor et al. | 381/43 |
| 5,280,585 | 1/1994 | Kochis et al. | 395/275 |
| 5,321,840 | 6/1994 | Ahlin et al. | 395/700 |
| 5,325,524 | 6/1994 | Black et al. | 395/600 |
| 5,371,901 | 12/1994 | Reed et al. | 395/2.84 |

FOREIGN PATENT DOCUMENTS

| | | | |
|---|---|---|---|
| 0108354 | 5/1984 | European Pat. Off. | G06F 15/16 |
| 0177405 | 4/1986 | European Pat. Off. | H04M 1/27 |
| 0534410 | 3/1993 | European Pat. Off. | G10L 5/00 |

OTHER PUBLICATIONS

International Search Report dated Apr. 7, 1995.
Farvardin, et al. "Efficient Encoding of Speech LSP Parameters Using The Discrete Cosine Transformation", ICASSP '89, pp. 168–171.

*Primary Examiner*—David R. Hudspeth
*Assistant Examiner*—Michael N. Opsasnick
*Attorney, Agent, or Firm*—Russell B. Miller; Linli L. Golden; Sean English

[57] ABSTRACT

A voice recognition system having a feature extraction apparatus is located in a remote station. The feature extraction apparatus extracts features from an input speech frame and then provides the extracted features to a central processing station. In the central processing station, the features are provided to a word decoder which determines the syntax of the input speech frame.

30 Claims, 3 Drawing Sheets

PRIOR ART

DISTRIBUTED VOICE RECOGNITION SYSTEM

This application is a continuation of application Ser. No. 08/534,080, filed Sep. 21, 1995 which is a continuation of Ser. No. 08/173,247, filed Dec. 22, 1993.

FIELD OF THE INVENTION

The present invention relates to speech signal processing. More particularly, the present invention relates to a novel method and apparatus for realizing a distributed implementation of a standard voice recognition system.

DESCRIPTION OF THE RELATED ART

Voice recognition represents one of the most important techniques to endow a machine with simulated intelligence to recognize user voiced commands and to facilitate human interface with the machine. It also represents a key technique for human speech understanding. Systems that employ techniques to recover a linguistic message from an acoustic speech signal are called voice recognizers (VR). A voice recognizer is composed of an acoustic processor, which extracts a sequence of information-bearing features (vectors) necessary for VR from the incoming raw speech, and a word decoder, which decodes this sequence of features (vectors) to yield the meaningful and desired format of output, such as a sequence of linguistic words corresponding to the input utterance. To increase the performance of a given system, training is required to equip the system with valid parameters. In other words, the system needs to learn before it can function optimally.

The acoustic processor represents a front end speech analysis subsystem in a voice recognizer. In response to an input speech signal, it provides an appropriate representation to characterize the time-varying speech signal. It should discard irrelevant information such as background noise, channel distortion, speaker characteristics and manner of speaking. Efficient acoustic feature extraction systems will furnish voice recognizers with higher acoustic discrimination power. The most useful characteristic is the short time spectral envelope. In characterizing the short time spectral envelope, the two most commonly used spectral analysis techniques are linear predictive coding (LPC) and filter-bank based spectral analysis models. However, it is readily shown (as discussed in Rabiner, L. R and Schafer, R. W., *Digital Processing of Speech Signals*, Prentice Hall, 1978) that LPC not only provides a good approximation to the vocal tract spectral envelope, but is considerably less expensive in computation than the filter-bank model in all digital implementations. Experience has also demonstrated that the performance of LPC based voice recognizers is comparable to or better than that of filter-bank based recognizers (Rabiner, L. R. and Juang, B. H., *Fundamentals of Speech Recognition*, Prentice Hall, 1993).

Referring to FIG. 1, in an LPC based acoustic processor, the input speech is provided to a microphone (not shown) and converted to an analog electrical signal. This electrical signal is then digitized by an A/D converter (not shown). The digitized speech signals are passed through preemphasis filter 2 in order to spectrally flatten the signal and to make it less susceptible to finite precision effects in subsequent signal processing. The preemphasis filtered speech is then provided to segmentation element 4 where it is segmented or blocked into either temporally overlapped or nonoverlapped blocks. The frames of speech data are then provided to windowing element 6 where framed DC components are removed and a digital windowing operation is performed on each frame to lessen the blocking effects due to the discontinuity at frame boundaries. A most commonly used window function in LPC analysis is the Hamming window, w(n) defined as:

$$w(n) = 0.54 - 0.46 \cdot \cos\left(\frac{2\pi n}{N-1}\right), 0 \leq n \leq N-1 \qquad 1$$

The windowed speech is provided to LPC analysis element 8. In LPC analysis element 8 autocorrelation functions are calculated based on the windowed samples and corresponding LPC parameters are obtained directly from autocorrelation functions.

Generally speaking, the word decoder translates the acoustic feature sequence produced by the acoustic processor into an estimate of the speaker's original word string. This is accomplished in two steps: acoustic pattern matching and language modeling. Language modeling can be avoided in the applications of isolated word recognition. The LPC parameters from LPC analysis element 8 are provided to acoustic pattern matching element 10 to detect and classify possible acoustic patterns, such as phonemes, syllables, words, etc. The candidate patterns are provided to language modeling element 12, which models the rules of syntactic constraints that determine what sequences of words are grammatically well formed and meaningful. Syntactic information can be a valuable guide to voice recognition when acoustic information alone is ambiguous. Based on language modeling, the VR sequentially interprets the acoustic feature matching results and provides the estimated word string.

Both the acoustic pattern matching and language modeling in the word decoder requires a mathematical model, either deterministic or stochastic, to describe the speaker's phonological and acoustic-phonetic variations. The performance of a speech recognition system is directly related to the quality of these two modelings. Among the various classes of models for acoustic pattern matching, template-based dynamic time warping (DTW) and stochastic hidden Markov modeling (HMM) are the two most commonly used. However, it has been shown that DTW based approach can be viewed as a special case of an HMM based one, which is a parametric, doubly stochastic model. HMM systems are currently the most successful speech recognition algorithms. The doubly stochastic property in HMM provides better flexibility in absorbing acoustic as well as temporal variations associated with speech signals. This usually results in improved recognition accuracy. Concerning the language model, a stochastic model, called k-gram language model which is detailed in F. Jelink, "*The Development of an Experimental Discrete Dictation Recognizer*", Proc. IEEE, vol. 73, pp. 1616–1624, 1985, has been successfully applied in practical large vocabulary voice recognition systems. While in the small vocabulary case, a deterministic grammar has been formulated as a finite state network (FSN) in the application of airline and reservation and information system (see Rabiner, L. R and Levinson, S. Z., A Speaker-Independent, Syntax-Directed, Connected Word Recognition System Based on Hidden Markov Model and Level Building, IEEE Trans. on IASSP, Vol. 33, No. 3, June 1985.)

Statistically, in order to minimize the probability of recognition error, the voice recognition problem can be formalized as follows: with acoustic evidence observation O, the operations of voice recognition are to find the most likely word string W* such that $$W^* = \arg\max P(W|O) \qquad (1)$$

where the maximization is over all possible word strings W. In accordance with Bayes rule, the posteriori probability P(W|O) in the above equation can be rewritten as:

$$P(W|O) = \frac{P(W)P(O|W)}{P(O)} \qquad (2)$$

Since P(O) is irrelevant to recognition, the word string estimate can be obtained alternatively as:

$$W^* = \arg\max P(W)P(O|W) \qquad (3)$$

Here P(W) represents the a priori probability that the word string W will be uttered, and P(O|W) is the probability that the acoustic evidence O will be observed given that the speaker uttered the word sequence W. P(O|W) is determined by acoustic pattern matching, while the a priori probability P(W) is defined by language model utilized.

In connected word recognition, if the vocabulary is small (less than 100), a deterministic grammar can be used to rigidly govern which words can logically follow other words to form legal sentences in the language. The deterministic grammar can be incorporated in the acoustic matching algorithm implicitly to constrain the search space of potential words and to reduce the computation dramatically. However, when the vocabulary size is either medium (greater than 100 but less than 1000) or large (greater than 1000), the probability of the word sequence, $W=(w_1,w_2,\ldots,w_n)$, can be obtained by stochastic language modeling. From simple probability theory, the prior probability, P(W) can be decomposed as $$P(W) = P(w_1, w_2, \ldots, w_n) = \prod_{i=1}^{n} P(w_i | w_1, w_2, \ldots, w_{i-1}) \qquad (4)$$

where $P(w_i|w_1,w_2,\ldots,w_{i-1})$ is the probability that $w_i$ will be spoken given that the word sequence $(w_1,w_2,\ldots,w_{i-1})$ precedes it. The choice of $w_i$ depends on the entire past history of input words. For a vocabulary of size V, it requires $V^i$ values to specify $P(w_i|w_1,w_2,\ldots,w_{i-1})$ completely. Even for the mid vocabulary size, this requires a formidable number of samples to train the language model. An inaccurate estimate of $P(w_i|w_1,w_2,\ldots,w_{i-1})$ due to insufficient training data will depreciate the results of original acoustic matching.

A practical solution to the above problems is to assume that $w_i$ only depends on (k-1) preceding words, $w_{i-1},w_{i-2},\ldots,w_{i-k+1}$. A stochastic language model can be completely described in terms of $P(w_i|w_1,w_2,\ldots,w_{i-k+1})$ from which k-gram language model is derived. Since most of the word strings will never occur in the language if k>3, unigram (k=1), bigram (k=2) and trigram (k=3) are the most powerful stochastic language models that take grammar into consideration statistically. Language modeling contains both syntactic and semantic information which is valuable in recognition, but these probabilities must be trained from a large collection of speech data. When the available training data are relatively limited, such as K-grams may never occur in the data, $P(w_i|w_{i-2},w_{i-1})$ can be estimated directly from bigram probability $P(w_i|w_{i-1})$. Details of this process can be found in F. Jelink, "The Development of An Experimental Discrete Dictation Recognizer", Proc. IEEE, vol. 73, pp. 1616–1624, 1985. In connected word recognition, whole word model is used as the basic speech unit, while in continuous voice recognition, subband units, such as phonemes, syllables or demisyllables may be used as the basic speech unit. The word decoder will be modified accordingly.

Conventional voice recognition systems integrate acoustic processor and word decoders without taking into account their separability, the limitations of application systems (such as power consumption, memory availability, etc.) and communication channel characteristics. This motivates the interest in devising a distributed voice recognition system with these two components appropriately separated.

SUMMARY OF THE INVENTION

The present invention is a novel and improved distributed voice recognition system, in which (i) the front end acoustic processor can be LPC based or filter bank based; (ii) the acoustic pattern matching in the word decoder can be based on hidden Markov model (HMM), dynamic time warping (DTW) or even neural networks (NN); and (iii) for the connected or continuous word recognition purpose, the language model can be based on deterministic or stochastic grammars. The present invention differs from the usual voice recognizer in improving system performance by appropriately separating the components: feature extraction and word decoding. As demonstrated in next examples, if LPC based features, such as cepstrum coefficients, are to be sent over communication channel, a transformation between LPC and LSP can be used to alleviate the noise effects on feature sequence.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a standard voice recognizer, either in recognition or in training, most of the computational complexity is concentrated in the word decoder subsystem of the voice recognizer. In the implementation of voice recognizers with distributed system architecture, it is often desirable to place the word decoding task at the subsystem which can absorb the computational load appropriately. Whereas the acoustic processor should reside as close to the speech source as possible to reduce the effects of quantization errors introduced by signal processing and/or channel induced errors.

Figure 2:
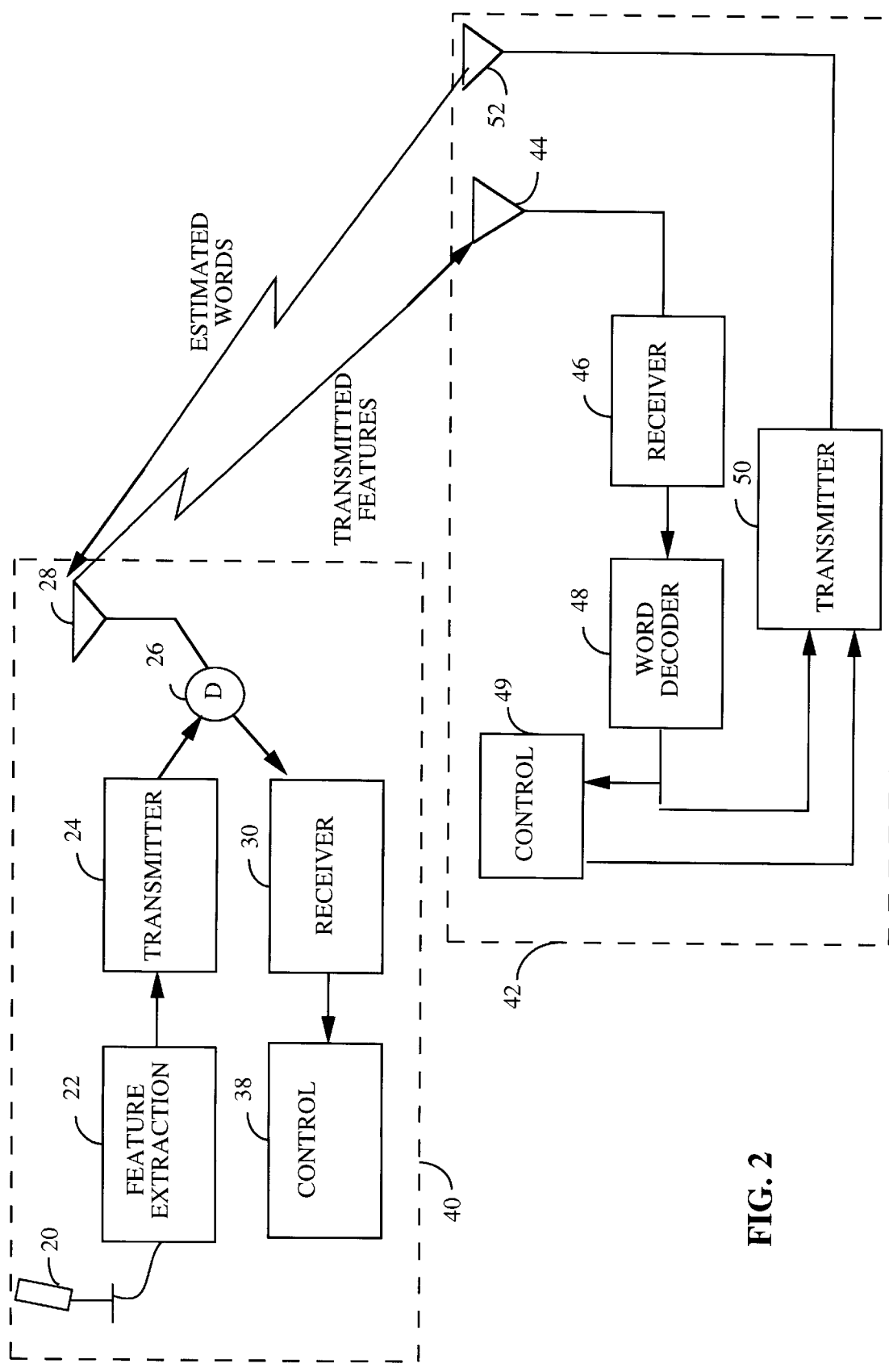
FIG. 2 is a block diagram of an exemplary implementation of the present invention in a wireless communication environment.

An exemplary implementation of the present invention is illustrated in FIG. 2. In the exemplary embodiment, the environment is a wireless communication system comprising a portable cellular telephone or personal communications device 40 and a central communications center referred to as a cell base station 42. In the exemplary embodiment the distributed VR system is presented. In the distributed VR the acoustic processor or feature extraction element 22 resides in personal communication device 40 and word decoder 48 resides in the central communications center. If, instead of distributed VR, VR is implemented solely in portable cellular phone it would be highly infeasible even for medium size vocabulary, connected word recognition due to high computation cost. On the other hand, if VR resides merely at the base station, the accuracy can be decreased dramatically due to the degradation of speech signals associated with speech codec and channel effects. Evidently, there are three advantages to the proposed distributed system design. The first is the reduction in cost of the cellular telephone due to the word decoder hardware that is no longer resident in the telephone 40. The second is a reduction of the drain on the battery (not shown) of portable telephone 40 that would result from locally performing the computationally intensive word decoder operation. The third is the expected improvement in recognition accuracy in addition to the flexibility and extendibility of the distributed system.

The speech is provided to microphone 20 which converts the speech signal into electrical signals which are provided to feature extraction element 22. The signals from microphone 20 may be analog or digital. If the signals are analog, then an analog to digital converter (not shown) may be needed to be interposed between microphone 20 and feature extraction element 22. The speech signals are provided to feature extraction element 22. Feature extraction element 22 extracts relevant characteristics of the input speech that will be used to decode the linguistic interpretation of the input speech. One example of characteristics that can be used to estimate speech is the frequency characteristics of an input speech frame. This is frequently provided as linear predictive coding parameters of the input frame of speech. The extracted features of the speech are then provided to transmitter 24 which codes, modulates and amplifies the extracted feature signal and provides the features through duplexer 26 to antenna 28, where the speech features are transmitted to cellular base station or central communications center 42. Various types of digital coding, modulation, and transmission schemes well known in the art may be employed.

At central communications center 42, the transmitted features are received at antenna 44 and provided to receiver 46. Receiver 46 may perform the functions of demodulating and decoding the received transmitted features which it provides to word decoder 48. Word decoder 48 determines, from the speech features, a linguistic estimate of the speech and provides an action signal to transmitter 50. Transmitter 50 performs the functions of amplification, modulation and coding of the action signal, and provides the amplified signal to antenna 52, which transmits the estimated words or a command signal to portable phone 40. Transmitter 50 may also employ well known digital coding, modulation or transmission techniques.

At portable phone 40, the estimated words or command signals are received at antenna 28, which provides the received signal through duplexer 26 to receiver 30 which demodulates, decodes the signal and then provides the command signal or estimated words to control element 38. In response to the received command signal or estimated words, control element 38 provides the intended response (e.g., dialing a phone number, providing information to display screen on the portable phone, etc.).

The same system represented in FIG. 2 could also serve in a slightly different way in that the information sent back from central communications center 42 need not be an interpretation of the transmitted speech, rather the information sent back from central communications center 42 may be a response to the decoded message sent by the portable phone. For example, one may inquire of messages on a remote answering machine (not shown) coupled via a communications network to central communications center 42, in which case the signal transmitted from central communications center 42 to portable telephone 40 may be the messages from the answering machine in this implementation. A second control element 49 would be collocated in the central communications center.

The significance of placing the feature extraction element 22 in portable phone 40 instead of at central communications center 42 is as follows. If the acoustic processor is placed at central communications center 42, as opposed to distributed VR, a low bandwidth digital radio channel may require a vocoder (at the first subsystem) which limits resolution of features vectors due to quantization distortion. However, by putting the acoustic processor in the portable or cellular phone, one can dedicate entire channel bandwidth to feature transmission. Usually, the extracted acoustic feature vector requires less bandwidth than the speech signal for transmission. Since recognition accuracy is highly dependent on degradation of input speech signal, one should provide feature extraction element 22 as close to the user as possible so that feature extraction element 22 extracts feature vectors based on microphone speech, instead of (vocoded) telephone speech which may be additionally corrupted in transmission.

In real applications, voice recognizers are designed to operate under ambient conditions, such as background noise. Thus, it is important to consider the problem of voice recognition in the presence of noise. It has been shown that, if the training of vocabulary (reference patterns) is performed in the exact (or approximate) same environment as the test condition, voice recognizers not only can provide good performance even in very noisy environments, but can reduce the degradation in recognition accuracy due to noise significantly. The mismatch between training and test conditions accounts for one of the major degradation factors in recognition performance. With the assumption that acoustic features can traverse communication channels more reliably than speech signals (since acoustic features require less bandwidth than speech signals for transmission as mentioned previously), the proposed distributed voice recognition system is advantageous in providing matching conditions. If a voice recognizer is implemented remotely, the matching conditions can be badly broken due mainly to channel variations such as fading encountered in wireless communications. Implementing VR locally may avoid these effects if the huge training computations can be absorbed locally. Unfortunately, in many applications, this is not possible. Obviously, distributed voice recognition implementation can avoid mismatch conditions induced by channel perplexity and compensate for the shortcomings of centralized implementations.

Figure 1:
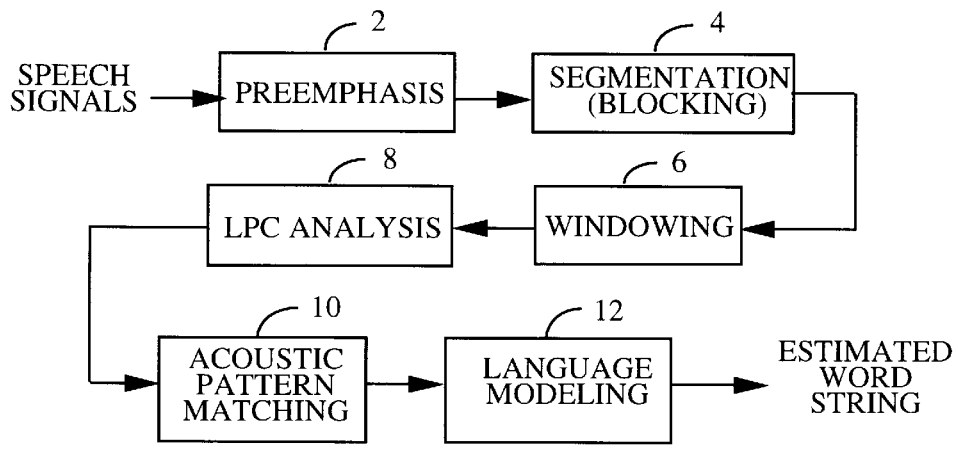
FIG. 1 is a block diagram of a traditional speech recognition system.
Figure 3:
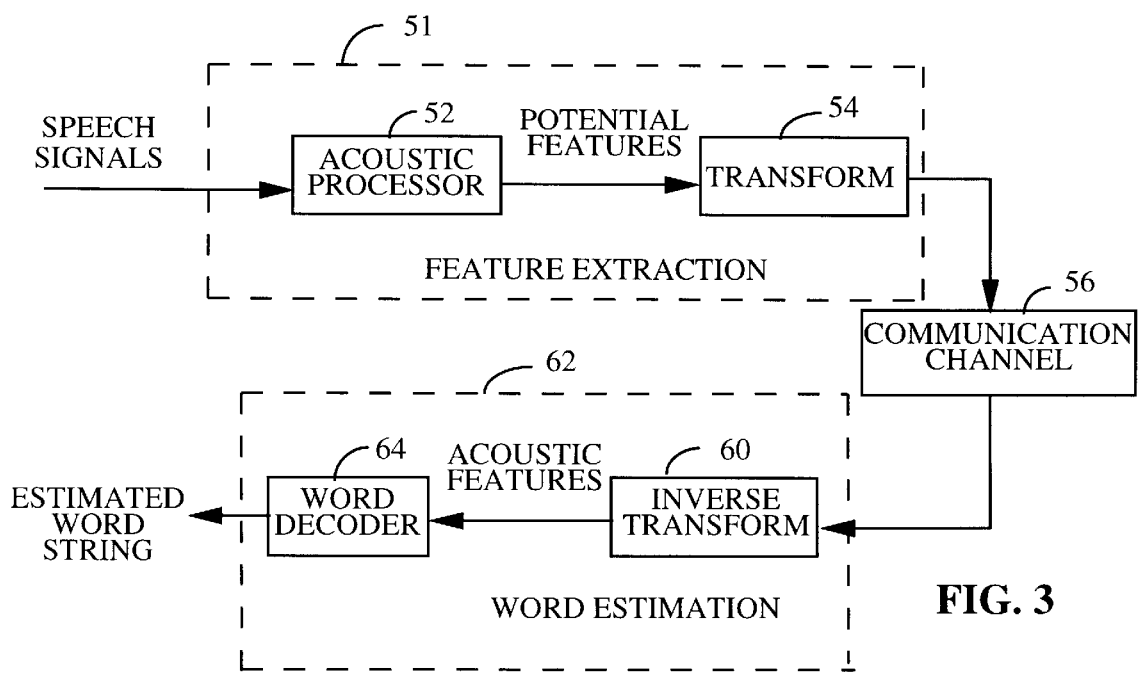
FIG. 3 is a general block diagram of the present invention.

Referring to FIG. 3, the digital speech samples are provided to feature extraction element 51 which provides the features over communication channel 56 to word estimation element 62 where an estimated word string is determined. The speech signals are provided to acoustic processor 52 which determines potential features for each speech frame. Since word decoder requires acoustic feature sequence as input for both recognition and training tasks, these acoustic features need to be transmitted across the communication channel 56. However, not all potential features used in typical voice recognition systems are suitable for transmission through noisy channels. In some cases, transform element 54 is required to facilitate source encoding and to reduce the effects of channel noise. One example of LPC based acoustic features which are widely used in voice recognizers is cepstrum coefficients, $\{c_i\}$. They can be obtained directly from LPC coefficients $\{a_i\}$ as follows:

$$c_m = a_m + \sum_{k=1}^{m-1}\left(\frac{k}{m}\right)c_k a_{m-k}, \quad m = 1, \ldots, P \tag{5}$$

$$c_m = \sum_{k=1}^{m-1}\left(\frac{k}{m}\right)c_k a_{m-k}, \quad m = P+1, \ldots, Q \tag{6}$$

where P is the order of LPC filter used and Q is the size of cepstrum feature vector. Since cepstrum feature vectors change rapidly, it is not easy to compress a sequence of frames of cepstrum coefficients. However, there exists a transformation between LPCs and line spectrum pair (LSP) frequencies which changes slowly and can be efficiently encoded by a delta pulse coded modulation (DPCM) scheme. Since cepstrum coefficients can be derived directly from LPC coefficients, LPCs are transformed into LSPs by transform element 54 which are then encoded to traverse the communication channel 56. At remote word estimation element 62, the transformed potential features are inverse transformed by inverse transform element 60 to provide acoustic features to word decoder 64 which in response provides an estimated word string.

Figure 4:
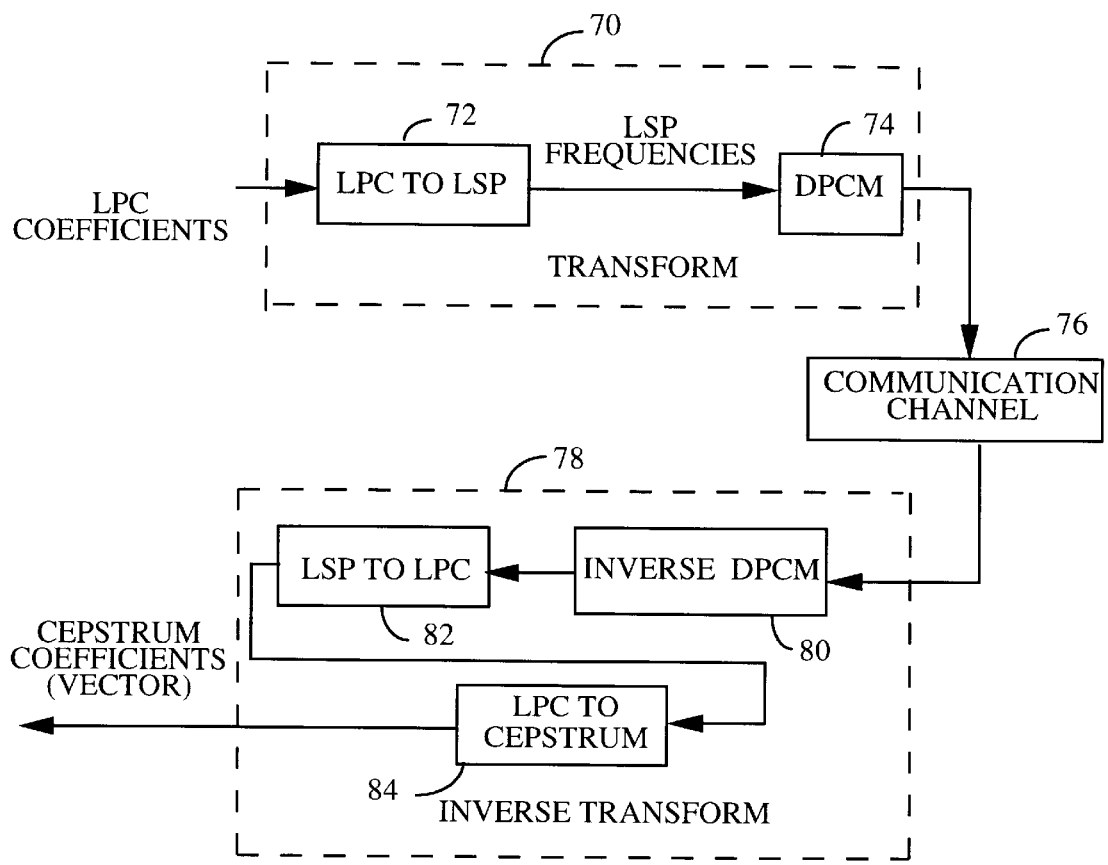
FIG. 4 is a block diagram of an exemplary embodiment of the transform element and inverse transform element of the present invention.

An exemplary embodiment of the transform element 54 is illustrated in FIG. 4 as transform subsystem 70. In FIG. 4, the LPC coefficients from acoustic processor 52 are provided to LPC to LSP transformation element 72. Within LPC to LSP element 72 the LSP coefficients can be determined as follows. For Pth order LPC coefficients, the corresponding LSP frequencies are obtained as the P roots which reside between 0 and $\pi$ of the following equations:

$$P(w) = \cos 5w + p_1 \cos 4w + \ldots + p_5/2 \tag{7}$$

$$Q(w) = \cos 5w + q_1 \cos 4w + \ldots + q_5/2 \tag{8}$$

where $p_i$ and $q_i$ can be computed recursively as follows:

$$p_0 = q_0 = 1 \tag{9}$$

$$p_i = -a_i - a_{P-i} - p_{i-1}, 1 \leq i \leq P/2 \tag{10}$$

$$q_i = -a_i + a_{P-i} - q_{i-1}, 1 \leq i \leq P/2 \tag{11}$$

The LSP frequencies are provided to DPCM element 74 where they are encoded for transmission over communication channel 76.

At inverse transformation element 78, the received signal from the channel is passed through inverse DPCM element 80 and LSP to LPC element 82 to recover the LSP frequencies of the speech signal. The inverse process of LPC to LSP element 72 is performed by LSP to LPC element 82 which converts the LSP frequencies back into LPC coefficients for use in deriving the cepstrum coefficients. LSP to LPC element 82 performs the conversion as follows:

$$P(z) = (1+z^{-1})\prod_{i=1}^{P/2}(1 - 2\cos(w_{2i-1})z^{-1} + z^{-2}) \tag{12}$$

$$Q(z) = (1-z^{-1})\prod_{i=1}^{P/2}(1 - 2\cos(w_{2i})z^{-1} + z^{-2}) \tag{13}$$

$$A(z) = 1 - \sum_{i=1}^{P} a_i z^{-i} = \frac{P(z) + Q(z)}{2} \tag{14}$$

The LPC coefficients are then provided to LPC to cepstrum element 84 which provides the cepstrum coefficients to word decoder 64 in accordance with equations 5 and 6.

Since the word decoder relies solely on an acoustic feature sequence, which can be prone to noise if transmitted directly through the communication channel, a potential acoustic feature sequence is derived and transformed in the subsystem 51 as depicted in FIG. 3 into an alternative representation that facilitates transmission. The acoustic feature sequence for use in word decoder is obtained afterwards through inverse transformation. Hence, in distributed implementation of VR, the feature sequence sent through the air (channel) can be different from the one really used in word decoder. It is anticipated that the output from transform element 70 can be further encoded by any error protection schemes that are known in the art.

Figure 5:
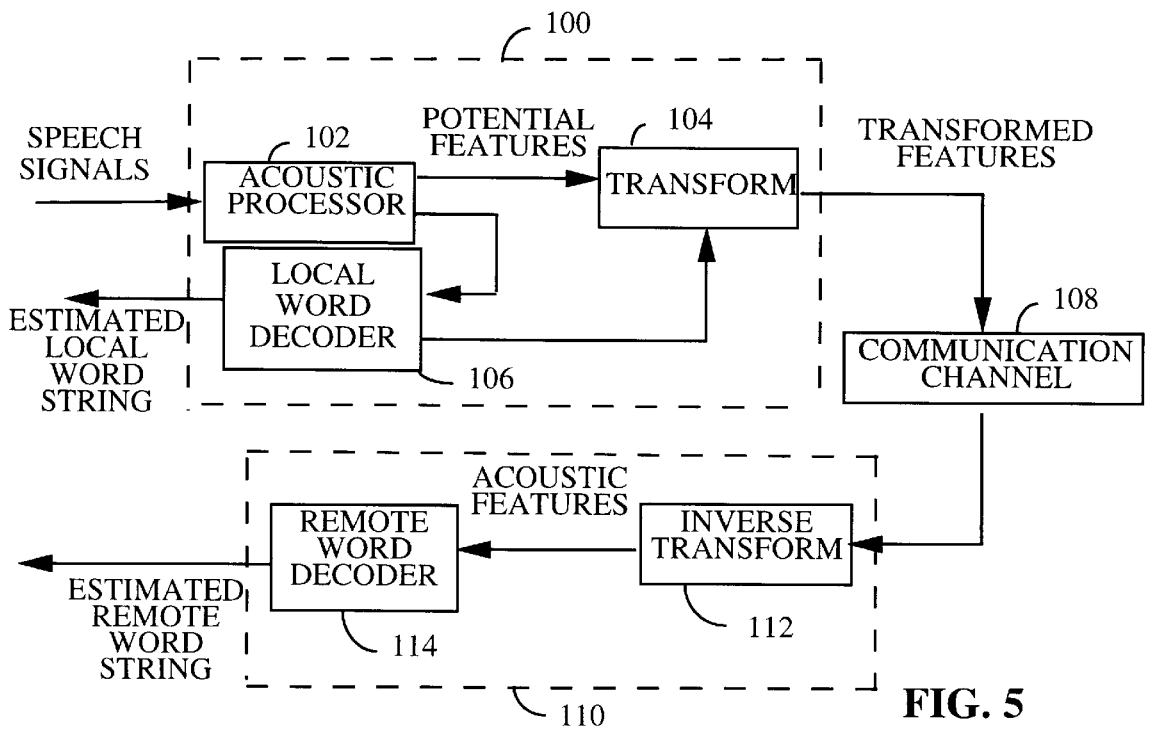
FIG. 5 is a block diagram of a preferred embodiment of the present invention comprising a local word detector in addition to a remote word detector.

In FIG. 5, an improved embodiment of the present invention is illustrated. In wireless communication applications, users may desire not to occupy the communication channel for a small number of simple, but commonly used voiced commands, in part due to expensive channel access. This can be achieved by further distributing the word decoding function between handset 100 and base station 110 in the sense that a voice recognition with a relatively small vocabulary size is implemented locally at handset while a second voice recognition system with larger vocabulary size resides remotely at base station. They both share the same acoustic processor at handset. The vocabulary table in local word decoder contains most widely used words or word strings. The vocabulary table in remote word decoder, on the other hand, contains regular words or word strings. Based on this infrastructure, as illustrated in FIG. 5, the average time that channel is busy may be lessened and the average recognition accuracy increased.

Moreover, there will exist two groups of voiced commands available, one, called special voiced command, corresponds to the commands recognizable by local VR and the other, called regular voiced command, corresponds to those not recognized by the local VR. Whenever a special voiced command is issued, the real acoustic features are extracted for local word decoder and voice recognition function is performed locally without accessing communication channel. When a regular voiced command is issued, transformed acoustic feature vectors are transmitted through channel and word decoding is done remotely at base station.

Since the acoustic features need not be transformed, nor be coded, for any special voiced command and vocabulary size is small for local VR, the required computation will be much less than that of the remote one (the computation associated with the search for correct word string over possible vocabularies is proportional to vocabulary size). Additionally, the local voice recognizer may be modeled with a simplified version of HMM (such as with a lower number of states, a lower number of mixture components for state output probabilities, etc.) compared to remote VR, since the acoustic feature will be fed directly to local VR without potential corruption in the channel. This will enable a local, though, limited vocabulary, implementation of VR at the handset where the computational load is limited. It is envisioned that the distributed VR structure can also be used in other target applications different than wireless communication systems.

Referring to FIG. 5, speech signals are provide to acoustic processor 102, which then extracts features, for example LPC based feature parameters, from the speech signal. These features are then provided to local word decoder 106 which searches to recognize the input speech signal from its small vocabulary. If it fails to decode the input word string and determines that remote VR should decode it, it signals transform element 104 which prepares the features for transmission. The transformed features are then transmitted over communication channel 108 to remote word decoder 110. The transformed features are received at inverse transform element 112, which performs the inverse operation of transform element 104 and provides the acoustic features to remote word decoder element 114 which in response provides the estimate remote word string.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A remote station for use in a mobile communications system, comprising:

feature extraction means located at the remote station for receiving a frame of speech samples and extracting a set of parameters for speech recognition;

first word decoder means for receiving said set of parameters and for extracting the meaning of said speech from said parameters in accordance with a small vocabulary; and transmission means for wirelessly transmitting a set of parameters that cannot be decoded by said first word decoder means to a receiving station having second word decoder means for extracting the meaning of said speech from the transmitted parameters in accordance with a larger vocabulary.

2. The remote station of claim 1, further comprising a microphone for receiving an acoustical signal and for providing said acoustical signal to said feature extraction means.

3. The remote station of claim 1, further comprising transform means interposed between said feature extraction means and said transmitter means for receiving said set of parameters and for transforming said set of parameters into an alternative representation of said set of parameters in accordance with a predetermined transformation format.

4. The remote station of claim 1, wherein said set of parameters comprises linear prediction coefficients.

5. The remote station of claim 1, wherein said set of parameters comprises line spectral pair values.

6. The remote station of claim 3, wherein said set of parameters comprises linear prediction coefficients and said predetermined transformation format is a linear prediction coefficient to line spectral pair transformation.

7. The remote station of claim 1, further comprising receiver means for receiving a response signal in accordance with a speech recognition operation upon said frame of speech.

8. The remote station of claim 7, further comprising control means for receiving said response signal and for providing a control signal in accordance with said response signal.

9. The remote station of claim 1, further comprising a transform element interposed between and having an input coupled to an output of said feature extraction means and having an output coupled to an input of said transmission means.

10. The remote station of claim 7, further comprising a control element having an input coupled to said receiver output and having an output for providing a control signal in accordance with said response signal.

11. A central communications station for use in a mobile communications system, comprising:

a word decoder located at said central communications station for receiving a set of speech parameters from a remote station physically separated from said central communications station and communicating therewith by wireless communications means, for performing a speech recognition operation on said set of speech parameters using a regular vocabulary associated with said word decoder located at said central communications station, wherein said speech parameters are not recognizable by a local vocabulary associated with a word decoder located in a remote station; and a signal generator for generating a response signal based on a result of said speech recognition operation.

12. The central communications station of claim 11, further comprising a receiver having an input for receiving a remote station speech parameter signal and for providing said remote station speech parameters to said word decoder means.

13. The central communications station of claim 11, further comprising control means having an input coupled to said word decoder output and having an output for providing a control signal.

14. A distributed voice recognition system, comprising:

a local word decoder located at a subscriber station for receiving extracted acoustic features of a first frame of speech samples and for decoding said acoustic features in accordance with a small vocabulary; and a remote word decoder located at a central processing station physically separated from said subscriber station for receiving extracted acoustic features of a second frame and for decoding, in accordance with a regular vocabulary, larger than said small vocabulary, said acoustic features of said second frame which cannot be decoded by said local word decoder.

15. The system of claim 14 further comprising a preprocessor for extracting said acoustic features of said frame of speech samples in accordance with a predetermined feature extraction format and for providing said acoustic features.

16. The system of claim 15 wherein said acoustic features are linear predictive coding (LPC) based parameters.

17. The system of claim 15 wherein said acoustic features are cepstral coefficients.

18. The system of claim 15 wherein said preprocessor comprises a voice coder (vocoder).

19. The system of claim 18 wherein said vocoder is a code excited linear prediction (CELP) vocoder.

20. The system of claim 18 wherein said vocoder is a linear predictive coding (LPC) based vocoder.

21. The system of claim 18 wherein said vocoder is a multi-band excitation (MBE) based vocoder.

22. The system of claim 18 wherein said vocoder is an ADPCM vocoder.

23. The system of claim 14 further comprising:

a transform element located at said subscriber station for receiving said acoustic features and for converting said acoustic features into transformed features in accordance with a predetermined transform format, said transformed features transmitted through a communication channel to said central processing station; and an inverse transform element located at said central processing station for receiving said transformed features and for converting said transformed features into estimated acoustic features in accordance with a predetermined inverse transform format, and for providing said estimated acoustic features to said remote word decoder.

24. The system of claim 23 wherein said acoustic features are linear predictive coding (LPC) based parameters, said predetermined transform format converts said LPC based parameters to line spectral pair (LSP) frequencies, and said inverse transform format converts said LSP frequencies into LPC based parameters.

25. The system of claim 14 wherein said local word decoder performs acoustic pattern matching based on a hidden Markov model (HMM).

26. The system of claim 14 wherein said remote word decoder performs acoustic pattern matching based on a hidden Markov model (HMM).

27. The system of claim 14 wherein said local word decoder performs acoustic pattern matching based on Dynamic Time Warping (DTW).

28. The system of claim 14 wherein said remote word decoder performs acoustic pattern matching based on Dynamic Time Warping (DTW).

29. The system of claim 14 wherein said subscriber station communicates with said central processing station by wireless communication means.

30. The system of claim 29 wherein said wireless communication means comprises a CDMA communication system.

* * * * *